US009805206B2

(12) United States Patent
Gounares

(10) Patent No.: US 9,805,206 B2
(45) Date of Patent: *Oct. 31, 2017

(54) SYSTEMS AND METHODS FOR CONTAINERIZED DATA SECURITY

(71) Applicant: Polyverse Corporation, Kirkland, WA (US)

(72) Inventor: Alexander G. Gounares, Kirkland, WA (US)

(73) Assignee: POLYVERSE CORPORATION, Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,920

(22) Filed: Jan. 30, 2017

(65) Prior Publication Data

US 2017/0140158 A1    May 18, 2017

Related U.S. Application Data

(63) Continuation of application No. 15/067,161, filed on Mar. 10, 2016.

(60) Provisional application No. 62/131,151, filed on Mar. 10, 2015.

(51) Int. Cl.
| | |
|---|---|
| H04L 29/06 | (2006.01) |
| H04L 29/08 | (2006.01) |
| G06F 21/60 | (2013.01) |
| G06F 21/62 | (2013.01) |

(52) U.S. Cl.
CPC ........ *G06F 21/602* (2013.01); *G06F 21/6209* (2013.01); *H04L 63/0428* (2013.01); *H04L 63/08* (2013.01); *H04L 63/1433* (2013.01)

(58) Field of Classification Search
CPC ... G06F 21/602; G06F 21/6209; H04L 63/08; H04L 63/0428; H04L 63/1433; H04L 63/1441
See application file for complete search history.

(56) References Cited

U.S. PATENT DOCUMENTS

| | | | |
|---|---|---|---|
| 8,352,941 B1 * | 1/2013 | Protopopov | G06F 9/45558 718/1 |
| 2011/0145593 A1 * | 6/2011 | Auradkar | G06F 21/6218 713/189 |
| 2012/0110328 A1 * | 5/2012 | Pate | G06F 21/6218 713/165 |

(Continued)

*Primary Examiner* — Noura Zoubair
(74) *Attorney, Agent, or Firm* — AEON Law; Adam L. K. Philipp; Jonathan E. Olson

(57) ABSTRACT

Provided herein are systems and methods useful in facilitating containerized data security. The system may include a data store, a computer processing unit, a network interface, and memory. The memory may contain executable instructions for causing the system to perform a containerized data security method including obtaining a first external communication from a source external to the system; associating the first external communication with the first container; authenticating the first external communication with respect to the first container; providing the first external communication to an unencrypted instance of the first container in the memory; obtaining a first responsive communication from the unencrypted instance of the first container; and providing the first responsive communication to the source external to the system.

9 Claims, 12 Drawing Sheets

(56) References Cited

U.S. PATENT DOCUMENTS

2013/0212709 A1* 8/2013 Tucker .................... G06F 21/55
                                                        726/29
2014/0122866 A1* 5/2014 Haeger ................. H04L 63/061
                                                        713/153
2014/0366155 A1* 12/2014 Chang .................... G06F 21/10
                                                        726/27
2015/0154418 A1* 6/2015 Redberg ............ G06F 17/30106
                                                        713/165

* cited by examiner

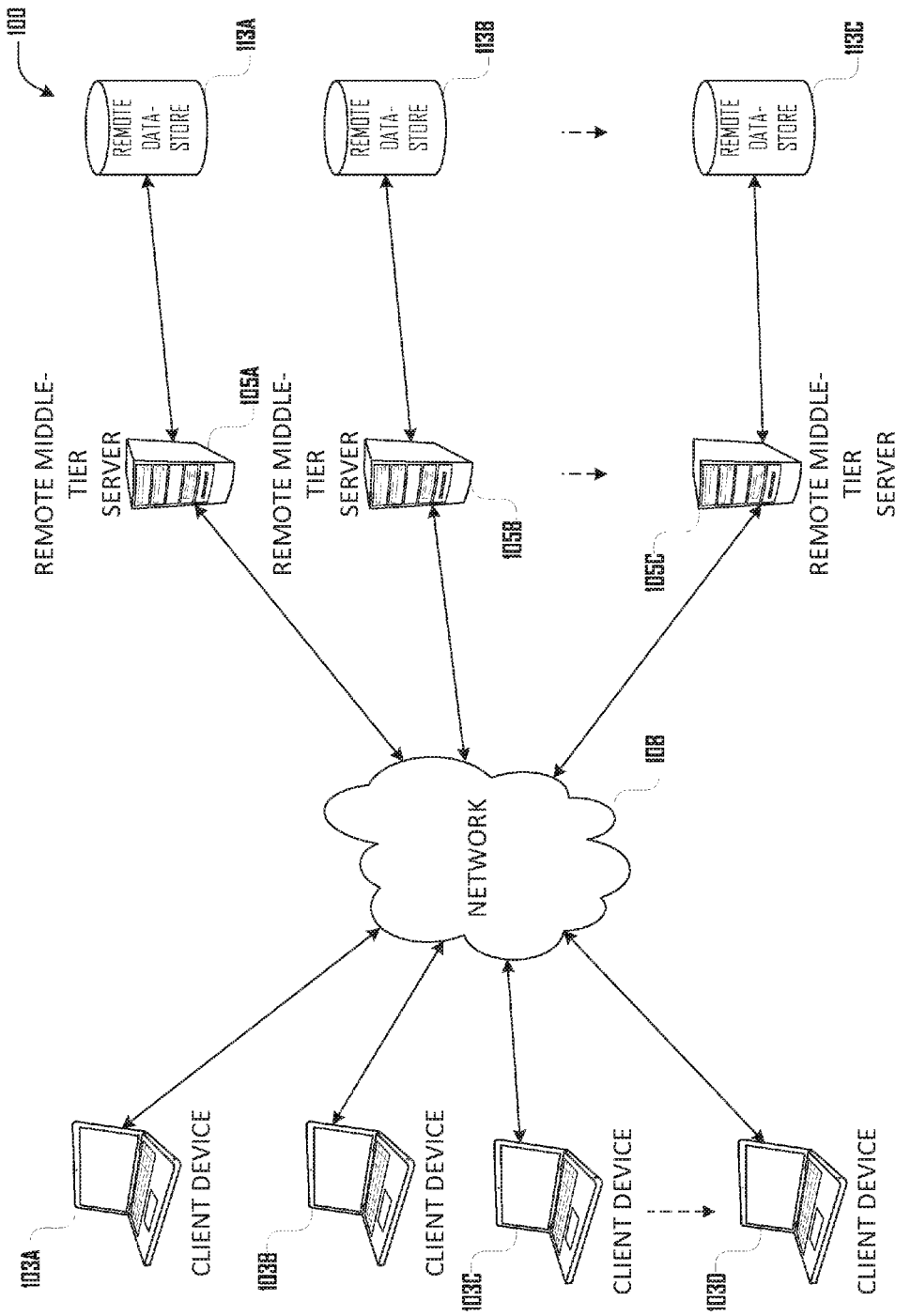

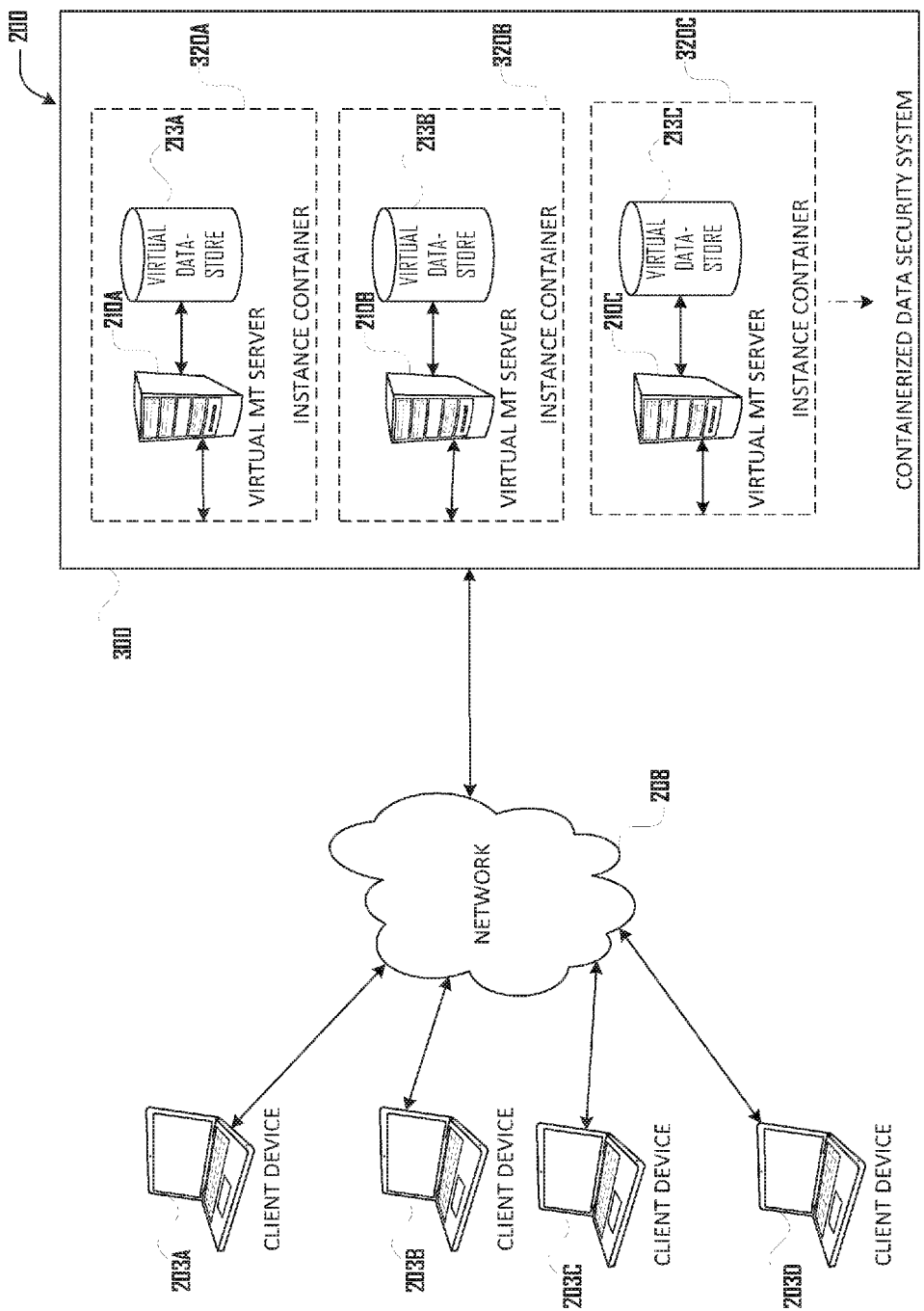

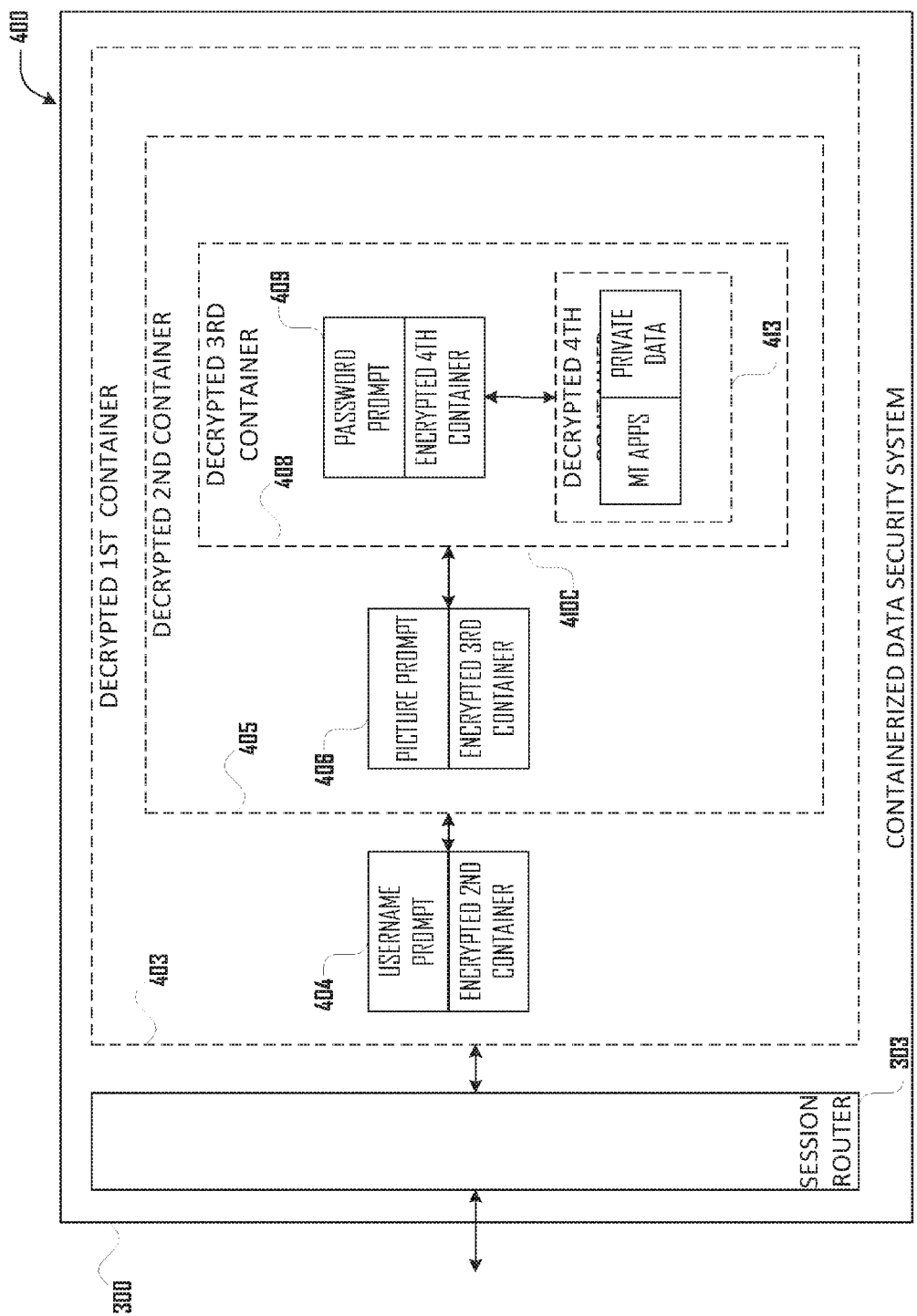

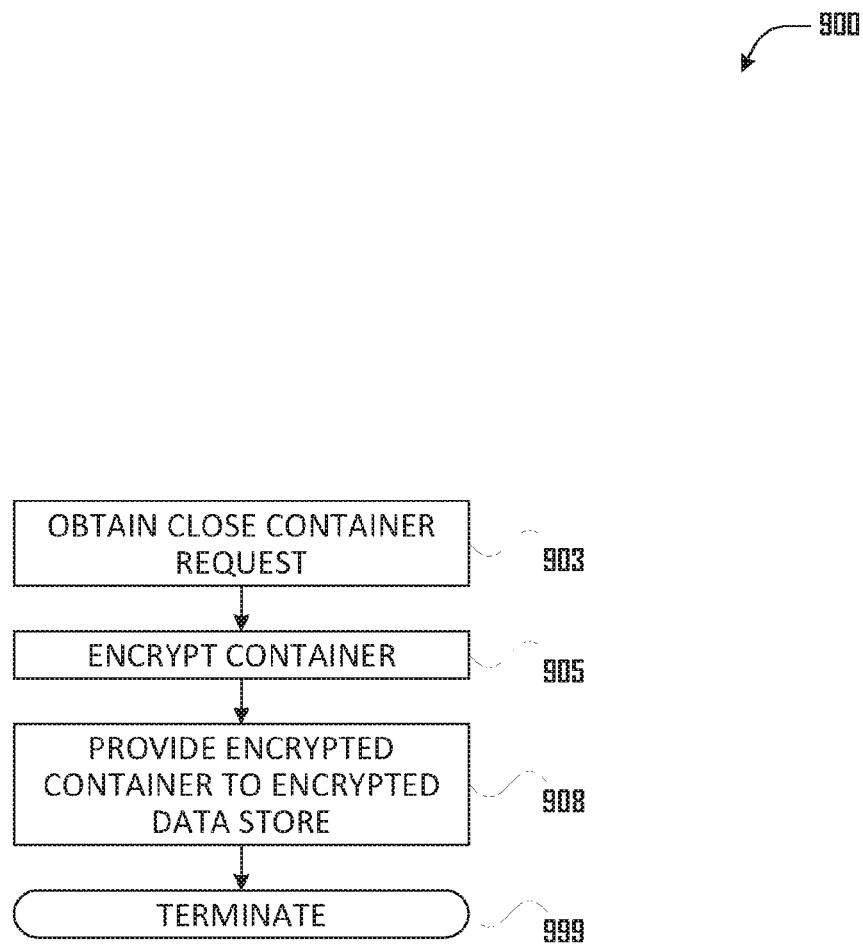

SYSTEMS AND METHODS FOR CONTAINERIZED DATA SECURITY

CROSS-REFERENCE TO RELATED APPLICATIONS

This application is a continuation of U.S. application Ser. No. 15/067,161, filed Mar. 10, 2016, titled "Systems and Methods for Containerized Data Security," and which claims the benefit of U.S. Provisional App. No. 62/121,151, filed Mar. 10, 2015, and titled "Systems and Methods for Containerized Data Security." The above cited applications are hereby incorporated by reference, in its entirety, for all purposes.

FIELD

The present specification relates to data center security technology aimed at preventing large-scale breaches of highly valuable information using a system of highly distributed individual containers to encapsulate individual records of large data sets along with all of the applications needed to work with the data.

BACKGROUND

As the world becomes increasingly digital, and digitally connected, cyber security continues to grow in importance. In today's world, cyber security is unfortunately asymmetric—and it favors the attacker. One fundamental aspect of the asymmetry today is the inherent "break once, run many" nature of contemporary systems.

Consider an operating system such as Windows 10™, produced by the Microsoft Corporation of Redmond, Wash. Copies of Windows 10 are readily available, affording anyone who may so desire an opportunity to study it in order to find exploitable security flaws. Typically, a flaw in one copy of Windows will exist in all copies of Windows (at least that version of Windows). Thus, once found, a single vulnerability could potentially be exploited on hundreds of millions of computers.

This 'break once, run many' nature makes the economics of cyber-attacks significantly favor the attacker. The effort applied to find and develop and exploit can be leveraged across a large number of targets. To make a cyber-attack worthwhile, the only remaining question is the value of the targeted data.

Fortunately for the attacker, an increasing amount of data is extremely valuable, from financial information on companies and individuals to health care records to engineering designs and other intellectual property. For example, in January 2015, insurance provider Anthem Blue Cross was the subject of a cyber-attack resulting in a data leak of records on eighty million people. Many companies and organizations are consequently investing a tremendous amount of time, energy, and resources to try to protect their IT systems and the data they contain.

Simplified Client/Server-Based Systems

FIG. 1A illustrates a simplified network topology of a multi-tier client/server-based information technology (IT) architecture 100. Client devices 103A-D and remote servers 105A-C are in data communication with a network 108. In various embodiments, network 108 may include the Internet, one or more local area networks ("LANs"), one or more wide area networks ("WANs"), cellular data networks, and/or other data networks. Network 108 may, at various points, be a wired and/or wireless network. Each remote server 105A-C may be in data communication with one or more respective remote data stores 110A-C.

In this and other examples, client devices 103A-D may be networked computing devices having a "laptop computer" form factor. Four client devices 103A-D are illustrated; however, in various implementations there may be many more client devices 103 (indicated by dotted line) which may have form factors including general purpose computers (including "desktop," "laptop," "notebook," "tablet" computers, or the like); mobile phones; watches, glasses, or other wearable computing devices; dedicated media players; motor vehicle head units; audio-video on demand (AVOD) systems; dedicated media consoles; or the like. Client devices 103A-D may represent a "presentation tier" within multi-tier client/server-based information technology (IT) architecture 100.

In various embodiments, remote servers 105A-B may be networked computing devices generally capable of accepting requests over network 108, e.g. from client devices 103A-D, each other, various databases, and/or other networked computing devices (not shown), and providing responses accordingly. Three remote servers 105A-C are illustrated; however, in various implementations there may be many more remote servers 105.

Remote servers 105A-C may represent a "middle tier" in multi-tier client/server-based information technology (IT) architecture 100. Each remote server 105 may provide applications and/or services (interchangeably and collectively referred to as middle-tier applications) that access and manipulate data, e.g. data stored in respective remote data stores 110A-C. These applications may exchange data with other applications operating on client devices 103A-D ("client applications"). Middle tier applications may relate to the provision of external websites, billing applications, internal analytics, and the like.

Conventional Remote Middle Tier Server

Referring to FIG. 1B, several components of an exemplary middle tier server 105 are illustrated. A conventional middle tier server may include many more components than those shown in FIG. 1B. However, it is not necessary that all of these generally conventional components be shown in order to disclose an operative example. As shown in FIG. 1B, exemplary middle tier server 105 may include a processing unit 114 in data communication with memory 118 via a bus 120. Memory 118 generally comprises some or all of random access memory (RAM), read-only memory (ROM), and/or a permanent mass storage device, such as a disk drive, flash memory, or the like.

Middle tier server 105 may also include a network interface 122 for connecting to a network such as network 102 and an optional user input 124 (or a user input port for connecting an external user input device (not shown)) and/or an optional display 126 (or a display port for connecting to an external display device (not shown)).

Memory 118 of middle tier server 105 may store program code, executable by processing unit 114, corresponding to an operating system 128, as well as program code corresponding to various middle tier applications 130 and various security applications 132.

These and other software components, as well as various data files (not shown) may be loaded into memory 118 via network interface 122 or via a selectively removable computer readable storage medium 134, such as an optical disc, memory card, or the like.

In operation, operating system 128 manages the hardware and software resources of middle tier server 105. For hardware functions such as network communications via network interface 122, obtaining data via optional user input 124, rendering data via optional display 126, and/or allocation of memory 118 to various resources, operating system 128 may act as an intermediary between software executing on middle tier server 105 and the server's hardware.

Although an exemplary middle tier server 105 has been described, a middle tier server may be any of a great number of computing devices capable executing program code, such as the program code corresponding to operating system 128, middle tier applications 130, and security applications 128.

Referring again to FIG. 1A, although details may vary, the high-level multi-tier client/server-based IT architecture 100 is representative of many implementations, regardless of the sensitivity/value of the data stored in various data stores. Various security technologies, such as firewalls, packet inspections, multi-factor authentication, logging and security analytics, and the like are used to prevent unauthorized access to such data.

However, such conventional security technology measures have proven to be at best partially effective; on a fundamental level it is possible that perfectly effective security technologies may not be feasible, at least not that also permit any meaningful usefulness and complexity. Even if a theoretically fully secure system could be developed, any useful system is going to at some point interact with a human user, and human users may be corrupted, confused, misled, or otherwise used by a malicious hacker (as used herein, the term "hacker" refers to one or more persons who seek to exploit weaknesses in a computer system or computer network). As long as high value data is stored in one place, yet remains accessible by both humans and software, it is vulnerable and going to be attacked, and eventually attacked successfully. And using these conventional techniques, the economics of attacking them still greatly favor the attacker. If a single organization stores sensitive records on 80 million customers in a database, any flaw anywhere in the system architecture, be it the database, the middle tier, the operating system, the network, etc., makes that data vulnerable to a cyber-attack.

Nearly all of today's software security approaches suffer from this fatal flaw, the problem of asymmetry. While a modern system with well-managed, up to date security systems can be incredibly hard to break, it is still breakable. The attackers have many exploit opportunities (that won't ever go away), and the "gains" from a successful attack can be extremely large.

By way of example, multi-tier client/server-based IT architecture 100 may be used to implement a simplified healthcare records system for a health insurance company is a useful example. In this example system, the medical records for eighty million individuals, along with personal information such as addresses, Social Security numbers, and credit card numbers may be sharded across three geographically separated data centers. The records are stored in respective remote data-stores 113A-D and must be protected from unauthorized manipulation (as herein, "manipulation" includes, for example, accessing, altering, copying, deleting, moving, and the like). For the purposes of this example, middle tier servers 105A-C each implement three middle tier applications for manipulating the data available in the server's respective data-store: (1) a web portal accessible by doctors and their patients; (2) a monthly patient report generator; and (3) an executive dashboard for the insurance company showing various statistics on their customer base.

As was described above in respect to FIG. 1, in a conventional architecture the records for a set of N customers (or other unit of interest) may be sharded across a relatively small number S of data centers and wherein exploiting a security vulnerability of one data center may expose the records of 1/S of the set of N customers and exposing the records of the full set of N customers may require exploiting the same vulnerability S−1 more times.

BRIEF DESCRIPTION OF THE DRAWINGS

FIG. 1A illustrates a simplified network topology of a conventional multi-tier client/server-based IT architecture.

FIG. 2 illustrates a simplified network topology of a multi-tier client/server-based IT architecture including an N unit containerized data security system in accordance with at least one embodiment.

FIG. 4 illustrates a simplified block diagram of a nested container data security system in accordance with at least one embodiment.

FIG. 9 illustrates a flow diagram of an exemplary container closing routine in accordance with aspects of at least one embodiment.

DESCRIPTION

Figure 1B:
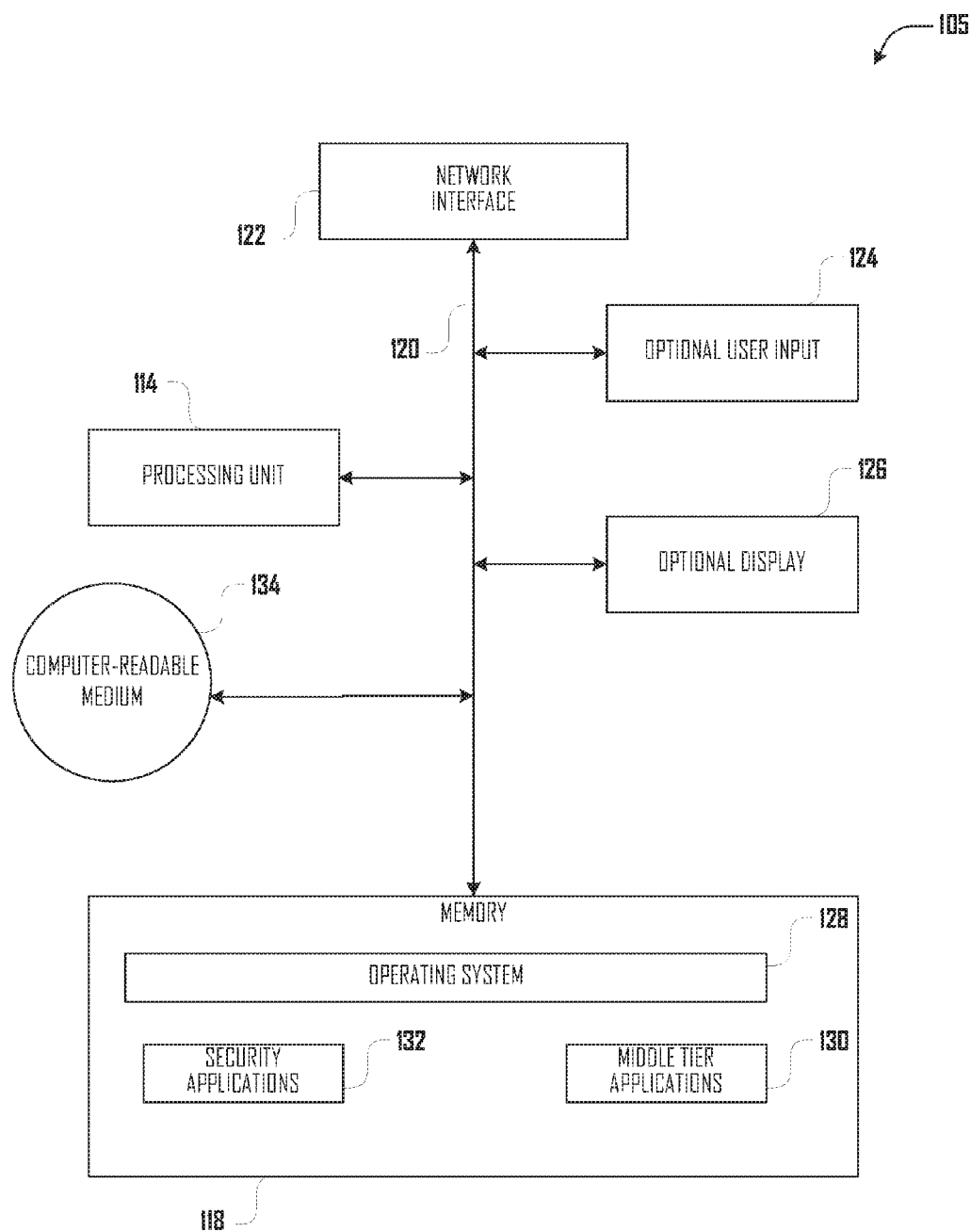
FIG. 1B illustrates a simplified block diagram of a conventional remote server suitable for use with the conventional multi-tier client/server-based IT architecture of FIG. 1A.

The detailed description that follows is represented largely in terms of processes and symbolic representations of operations performable by what may otherwise be conventional computer devices, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network, which may include, but is not limited to, the Internet.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent for the described embodiments to limit the scope of the present methods and systems as they are defined by the Claims which follow this Description. On the contrary, the intent is to cover all alternatives, modifications, and equivalents. In alternate embodiments of the present methods and systems, additional devices, or combinations of illustrated devices, may be added to, or combined.

The present methods and systems relate to a containerized data security system. As used herein, the term "container" is an abstract representation of (1) executable instructions (corresponding to, for example, various middle-tier applications such as those previously described, security applications, an operating system, a virtual machine, and the like) and/or (2) data intended for manipulation by those executable instructions that is associated with one or more units of interest to the containerized data security system (e.g. customer identifiers, product identifiers, and/or the like). At any given time, a container may be in one of at least two non-transitory states: an open state, wherein at least a portion of the container's contents exists actively in the memory of one or more devices, such as one or more instances of a server computer, and a closed state, wherein the container exists statically in a long term storage device, such as a data store.

Multi-Tier Client/Server-Based IT Architecture Including an N Unit Containerized Data Security System FIG. 2 illustrates a simplified network topology of a multi-tier client/server-based IT architecture 200 including an N unit containerized data security system 300, described in more detail below with reference to FIG. 3, in accordance with various aspects of the present methods and systems. Client devices 203A-D and containerized data security system 300 are in data communication via a network 208. Client devices 203A-D and network 208 may be similar to client devices 103A-D and network 108, as described above in reference to FIG. 1.

In the example shown in FIG. 2, each container 320A-C may include a respective virtual middle tier server 210 and virtual data store 213. A virtual middle tier server 213 may host a limited number of middle-tier applications and the virtual data store may include only the data associated with the current session. As is explained below, when a device, such as client device 203A, connects to containerized data security system 300 via network 208, the containerized data security system may appear to the client device to be a conventional middle tier server, such as remote middle tier server 105A.

Containerized Data Security System

Figure 3:
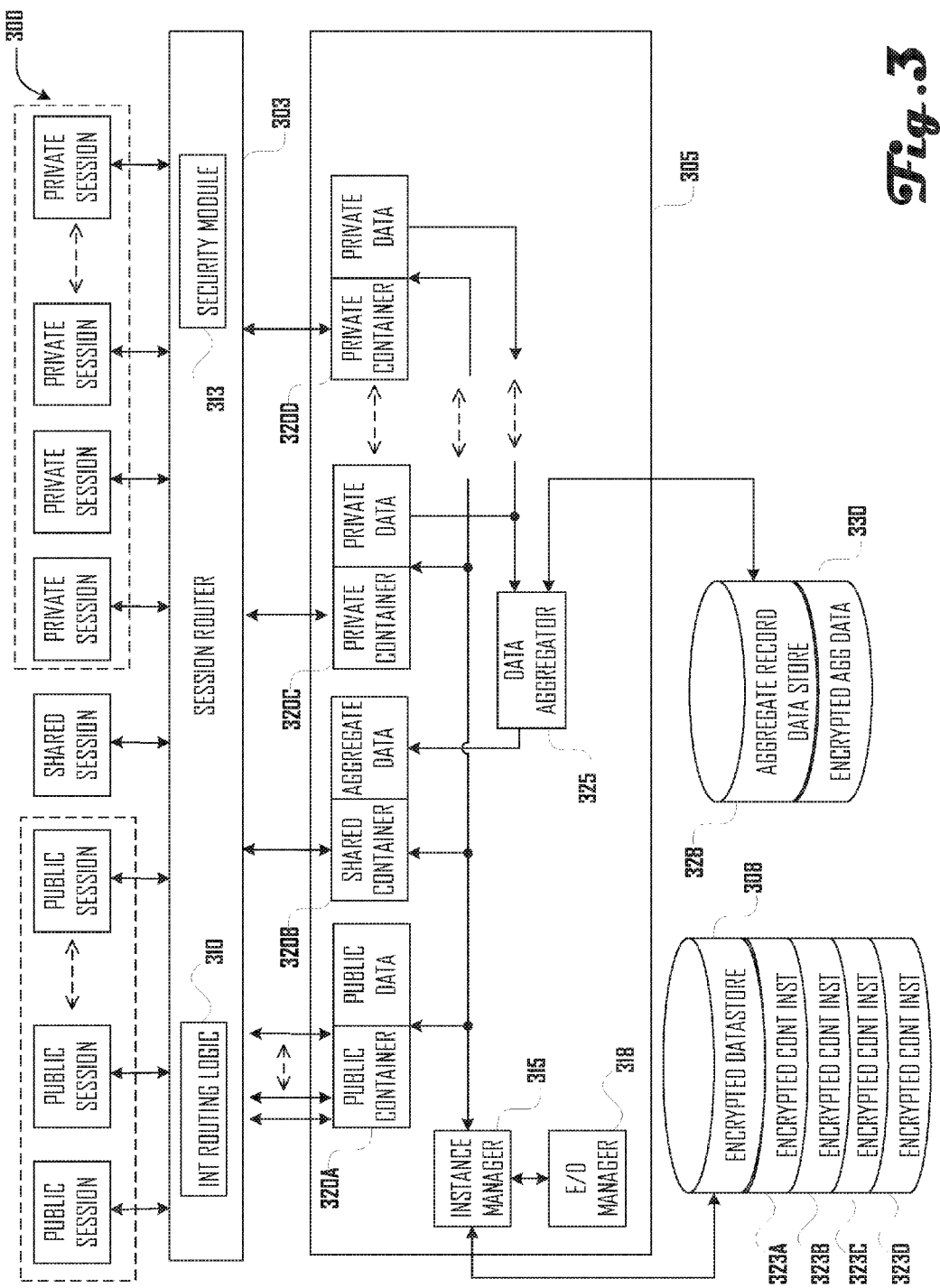
FIG. 3 illustrates a control flow of a containerized data security system in accordance with at least one embodiment.

FIG. 3 illustrates an exemplary N unit containerized data security system 300 in accordance with the present methods and systems.

Containerized data security system 300 may include at least a session router 303, a container instance manager 305, and an encrypted data record datastore 308. These components may collectively create an illusion of conventional middle and data tier components of a multi-tier client/server-based IT architecture to the outside world. However, instead of maintaining one or more remote middle tier servers connected to one or more remote data-stores to implement a system's middle and data tiers, (as illustrated in FIG. 1, discussed above), session router 303 routes incoming requests to instances of middle tier applications running within various open container instances 320 maintained by container instance manager 305.

Session router 303 may include internal routing logic 310 and a security module 313. Internal routing logic 310 may intelligently select an appropriate traffic management methodology depending on the implementation. Session router 303 may, for example, monitor external network traffic for requests addressed to only those ports on which a middle-tier server would ordinarily expect to receive legitimate communication from a client device, e.g. standard http/https ports 80 and 443. Internal routing logic 310 listens for outside requests (e.g. a TCP session synchronization request, a data request, and the like) and determines whether the request should be routed to an existing open container 320. If so, internal routing logic 310 routes the to the appropriate container 320, e.g. utilizing software defined networking techniques (where network control is decoupled from forwarding functions) and/or http proxy servers. If not, internal routing logic 310 may provide the request to an instance manager 315, which may determine which closed container, if any, should be opened in response to the request. In certain embodiments, an authenticated login may provide the decryption key for an individual container. Once a log in attempt from an external device, e.g. a client device, is authenticated, an encrypted communication channel, e.g. https, between the container and the external device is established.

Security module 313 may monitor the communication channels between external communication sessions and various containers for purposes of semantic level traffic inspection. For example, security module 313 may track traffic into and out of various open containers and compare the traffic to expected, legitimate traffic patterns for those containers. Traffic that diverges from these expected patterns may: be flagged for additional monitoring; trigger a container recycling procedure, wherein the some or all of the contents of an open container are discarded and the closed instance of the container is reloaded by instance manager 315, trigger an application reloading procedure, wherein some or all of the various middle tier applications instantiated in an open container are discarded and replaced with new, randomized instantiations of the same applications (described in more detail below); be redirected to a 'honeypot' container, or blacklisted/blocked outright.

Container instance manager 305 may include an instance manager 315, an encryption/decryption (E/D) manager 318, and one or more open container instances 320, such as open container instances 320A-D. Upon receiving a request to open a container, e.g. from session router 303, instance manager 315 may obtain a closed, encrypted copy 323 of the container from encrypted datastore 308. Instance manager 315 may provide the encrypted, closed copy 323 of the container to E/D manager 318. Instance manager may also provide E/D manager with authentication data, such as a key obtained via the request to open the container. Assuming the key is authentic, E/D manager may decrypt the closed, encrypted copy 323 of the container and provide a decrypted version to instance manager 315. Instance manager 315 may then instantiate a corresponding open container instance 320 and provide session router 303 with appropriate routing information.

Containerized data security system may contain orders of magnitude more containers, than are required to be open at any given time. Even one tenth of one percent of total containers being in an open state at any one time would be a very actively used system for some implementation scenarios. Thus, instance manager 315 and E/D manager 318 may respectively close and encrypt open container instances 320 that are not in use and open and decrypt closed, encrypted copies 323 of containers when needed.

In some embodiments, E/D manager 318 may include a centralized key management service to store private keys for each individual container. Those keys themselves may be encrypted, e.g. using envelope encryption, thereby increasing the difficulty of compromising the keys. In other embodiments, E/D manager 318 may use a distributed key management service. For example, private keys for individual users could be stored on a client device. Such a fully distributed key management service may be more resilient to attack than a centralized key management service.

Various embodiments may use a layered encryption approach. For example, an 'instance master' key may provide partial access to data across multiple containers, while individual keys may provide complete access to data within a single container.

Containers

From a security perspective, the more middle and data tier functionality that can be encapsulated within a given container, the smaller the available attack surface. In some embodiments, all manipulation of sensitive data is done within a container, and the data entering and leaving the container is narrow and well defined.

As previously noted, it is assumed data cannot be both accessible for authorized manipulation and perfectly secure from unauthorized manipulation. Within the context of that assumption, when a container is closed, the data associated with the container is relatively less accessible for authorized manipulation and relatively more secure from unauthorized manipulation and when the container is open the associated data is relatively more accessible for authorized manipulation and relatively less secure from unauthorized manipulation.

Each container may be individually encrypted when it is closed, being decrypted only when needed. Additionally, each open container may implement the same level of additional security measures as may be implemented in a conventional architecture. In the virtual middle tier server example, all unnecessary ports of the virtual middle tier server may be closed; firewall, packet inspector, anti-virus services may be installed and instantiated; the data portion may be protected by additional encryption layers; and the like. Thus, each container instance may have the same or better level of security as the system as a whole did under a conventional architecture.

In addition to enabling standard security techniques on each individual container, certain embodiments allow for improved control and inspection of the channels going in and out of the container. Because the container only exposes a specific set of middle tier functionality, all other communications with the container may be automatically blocked. In essence, middle tier services must be explicitly white listed in order to be exposed to the world outside of the container.

Containers may be categorized based the needs of a given implementation. While there can be an arbitrary number of container types, in some embodiments containers may be grouped into three major categories of public containers, e.g. container 320A, shared containers, e.g. container 320B, and private containers, e.g. containers 320C-D.

A public container may contain data and related middle tier applications for 'public' information within a containerized data security system, i.e. information that does not require any form of authentication to access, such as the data corresponding to public pages of a commercial web site like the 'home' page, 'about us' page, product documentation and marketing information, etc. may be stored in one or more public containers. Note that "public" does not imply unsecured—publicly accessibly information should not necessarily be open to all forms of manipulation. For extra security, a container cycling mechanism may be provided, wherein an instance of a public container may be periodically discarded and replaced with a 'known good state' instance of the container to remove attacks that may have succeeded in compromising the code inside the container.

A shared container may contain data and related middle tier applications for non-public but internally shared information within containerized data security system 300, such as internal organizational dashboards. An example of shared container 320B is discussed below with respect to optional data aggregator 325 and optional aggregate record data store 328.

In various embodiments, most containers will be private containers, in which data is broken up and distributed as finely as possible across the containerized data security system's private containers. In contrast to the conventional multi-tier client/server-based IT architecture 100 (described above with reference to FIG. 1), various embodiments of the present methods and systems may shard the data related to a set of N units of interest across P private containers, where P can be any integer from 1 to N but is preferably as close to N as permitted by a given implementation, with each private container being specific to a single unit of interest. Each private container may contain data and related middle tier applications for N/P units of interest. In such embodiments, exploiting a security vulnerability of the executable instructions within a particular private container may expose only the data for the unit(s) of interest associated with that container; exposing the records of the full set of N units of interest may require exploiting the same vulnerability P−1 additional times.

The sharding dimension P may vary by implementation, e.g. in some implementations it may be more beneficial to shard into small groups of units of interest versus by individual units. For example, if the number of units of interest is extremely large, the sharding algorithm could be a hash on a unit identifier, effectively grouping units into buckets of 10 or 100 (or whatever size is desired and/or optimal for the particular implementation). Container instance manager 305 may utilize any suitable deterministic sharding algorithm to computer the sharding dimension P. For example, customer records may be sharded by various characteristics of the customer identifier, zip code, area code, name, age, birth date, first transaction date, or the like.

Certain embodiments may dynamically adjust the number of containers in use; balancing security versus cost in the most appropriate way for a given implementation deployment.

In other aspects of the present methods and systems, the container model may be applied to the authentication system itself, for example via nested containers, where each phase of authentication opens an additional, more protected inner container containing a its own light weight version of a containerized data security system. Referring to FIG. 4 for example, a secure login procedure may open a first container 403 upon obtaining a log in request. From within first container 403, containerized data security system 404 may generate a username prompt. If the response to the username prompt is authenticated (e.g. a valid username is provided), containerized data security system 404 may open a second container 405 within first container 403. From within second container 405, containerized data security system 406 may generate a user-defined picture authentication prompt. If a response to the user-defined picture authentication prompt is authenticated (e.g. a valid user-defined response to the prompt is provided), containerized data security system 406 may open a third container 408 within second container 405. From within third container 408, containerized data security system 409 may generate a password prompt. If the response to the password prompt is authenticated (e.g. a valid password is provided), containerized data security system 409 may unlock a fourth container 413.

Containerized data security system 300 also permits deployment of various randomization technologies. For example, each individual container may have a randomized memory address space, which has been shown to slow down, although not prevent, several types of automatic attacks. Security technologies that can slow down or make attacks more difficult become proportionally more useful in certain embodiments, as the techniques may be applied across all containers. Instruction set and binary randomization technologies may also be deployed within certain embodiments. For example, multiple randomized binary versions of a middle tier application may be created such that an attack that is designed to exploit a weakness in one version may be ineffective against another version, such as by randomizing register allocation during compilation of the application binaries. Other techniques may also be used. For example, homomorphic execution may enable a container to be open (i.e. its contents accessible to some types of manipulation) without being decrypted.

Various embodiments of containerized data security system 300 also permits container cycling techniques. For example, in a public container containing a publicly accessible high volume website with search functionality, bugs in the search functionality, such as a script injection error, could allow an attacker to compromise the web site and perform malicious attacks, such as defacing the appearance of the website by manipulating the underlying data. A container cycling technique in accordance with the present methods and systems may mitigate the effect of this style of attack. Just as private data associate with units of interest may be split into P private containers, general web traffic may also be split across multiple public containers. Instance manager 315 may instantiate multiple, 'identical' public containers to service the system's web traffic. These containers may be used and then discarded after some short time period, such as five seconds. Thus, an attacker who successfully compromises the web site within one of those containers would both (a) only be able to deface the website for that portion of the web traffic hitting the system that is being routed to that particular container and b) only have five seconds to complete any subsequent follow on attacks before the compromised container is discarded and a new, uncompromised container is put into place. It should be noted that container cycling does not completely prevent all forms of attack for websites, but it does help reduce the asymmetry in attacks, e.g. an attacker can no longer rely on owning a compromised system for an indefinite period of time.

In certain non-limiting embodiments, it may be desirable to have containers in an inactive and encrypted state whenever they are not needed. However, an IT department may run batch style jobs a periodic basis, such as running monthly invoices and applying software updates. However, if a single actor (e.g. the IT department) can invoke execution of the entirety of a system's container population, that actor can become a point of attack to compromise the entire secure data set. Therefore, routes enabling access to data within multiple containers should be avoided, or at the least should be managed very carefully.

From an implementation standpoint, every container is encrypted and stored in encrypted datastore 308. Certain non-limiting embodiments of the present methods and systems may utilize three distinct modes for operating on data: (1) fully contained; (2) promoted container properties; and (3) aggregation services.

In the fully contained mode of operation, the data and all code that operates on it is entirely within the bounds of the container. This is the preferred and default case.

In the promoted container property mode of operation, certain container properties may be dynamically updated from outside of the container. Typically, these properties may be data for which a less strict security regime is tolerable, such as customer name and account status (active, inactive, etc.).

In some contexts, it may be inappropriate to expose certain data as a promoted property, e.g. because the data is particularly sensitive. For these cases certain embodiments may use a 'push' aggregation model to perform whatever computation is needed. For example, each container, upon first run or upon a change to a particular sensitive data category, may make an anonymous and secure call to an aggregation service, such as optional data aggregator 325. The call could simply contain information sufficient to enable optional data aggregator 325 to associate the call with the correct category, a "yes" or "no" indication, and no other identifying information. This is sufficient to compute various complex aggregations and computations without having to expose the data itself or associate it with a particular unit of interest. It should be noted though that care must be taken in deciding what data to push out, as exposing too much information even anonymously could enable an attacker to compute or infer a great deal of otherwise confidential information.

Such embodiments also provide enough flexibility to handle most if not all of traditional batch jobs, such as monthly invoice generation, software updates, and the like.

Series of Communications

Figure 5A:
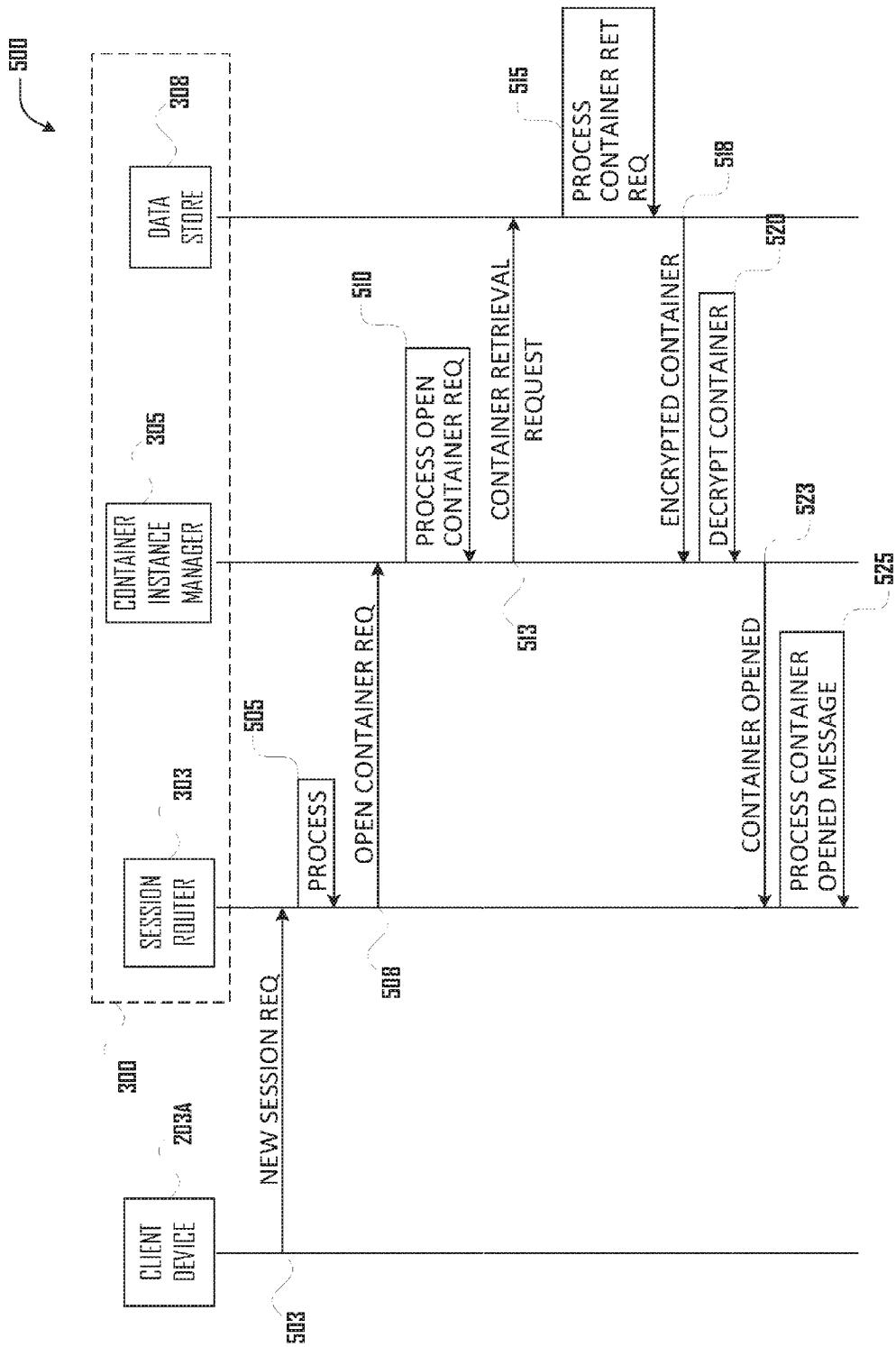
FIGS. 5A-C illustrates an exemplary series of communications between various devices a multi-tier client/server-based IT architecture of FIG. 2 and components of the containerized data security system of FIG. 3 in accordance with at least one embodiment.
Figure 5B:
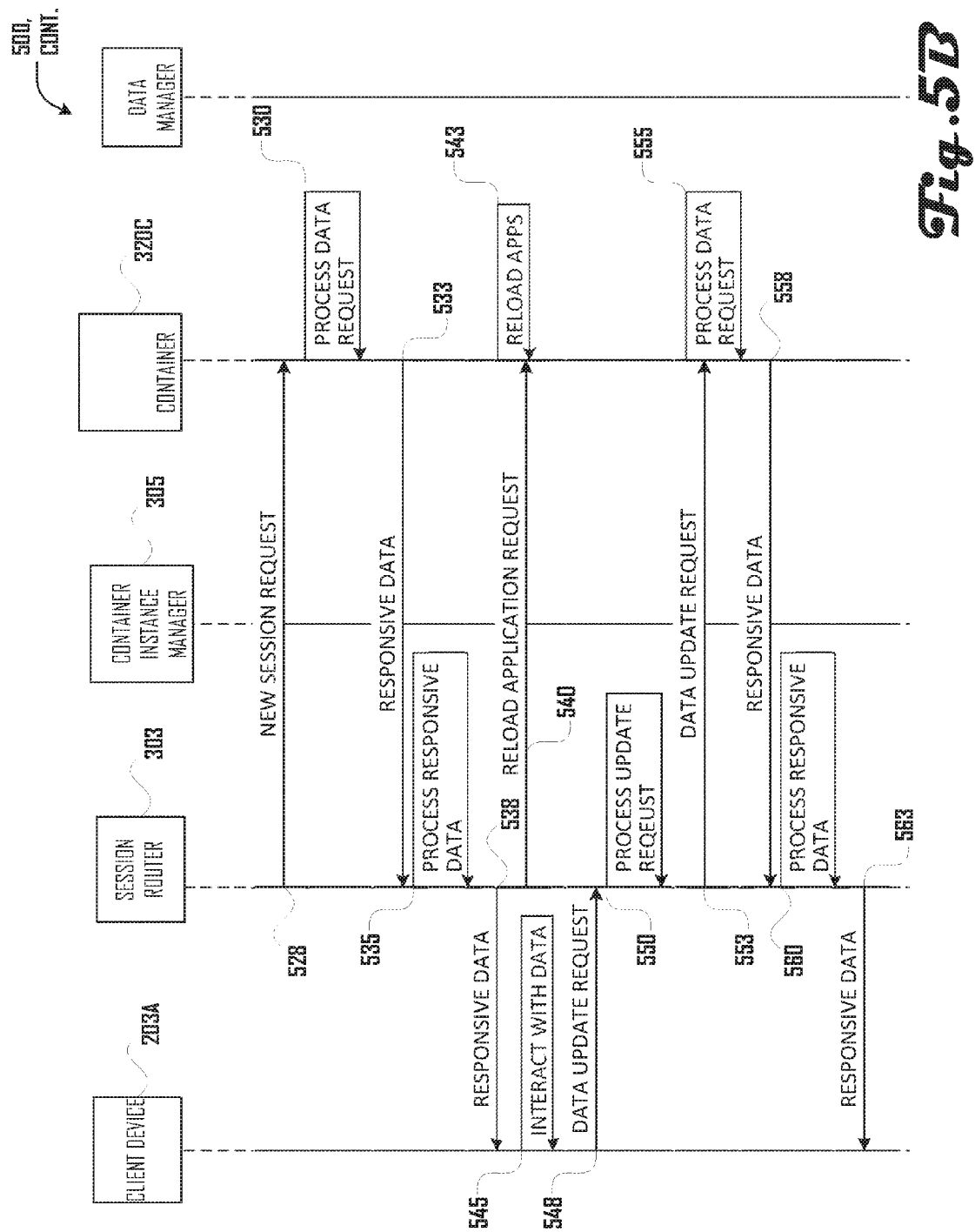
Figure 5C:
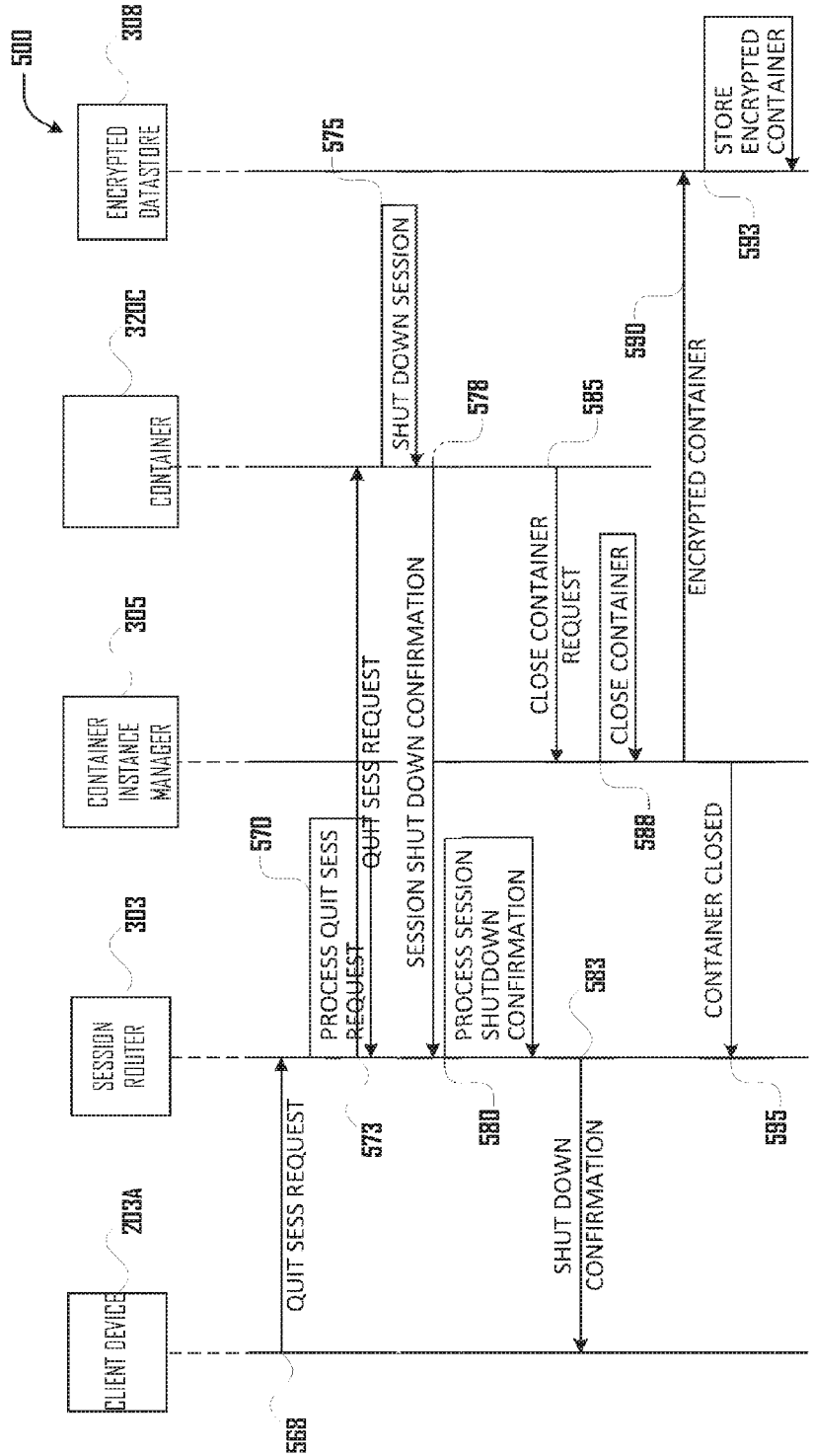

FIGS. 5A-C illustrate an exemplary series of communications 500 between client 203A device and various components of containerized data security system 300.

Client device 203A provides a new session request 503 addressed to an IP address associated with containerized data security system 300.

Session router 303 obtains new session request 503 and processes it to determine which open container instance the request should be routed to and/or if a new container instance should be opened. For the purposes of exemplary series of communications 500 it is assumed session router 303 determines a new container instance should be opened in response to the new session request 503. Session router 303 therefore provides an open container request 508 to container instance manager 305.

Container instance manager 305 may process 510 open container request 508 and provides a container retrieval request 513 to encrypted datastore 308. Encrypted datastore 308 may process 515 container retrieval request 513, look up the appropriate closed, encrypted container 323 and responsively provide a copy of the encrypted container 518 to container instance manager 305.

Container instance manager 305 may authenticate open container request 508, e.g. by attempting to decrypt 520 the encrypted container copy using a key obtained (or identified) via the open container request. Assuming open container request 508 is authenticated, container instance manager may provide a container opened response 523 to session router 303, informing the session router the requested container has been opened successfully.

Session router 303 processes 523 the container opened response 520, e.g. by incorporating information relating to the newly opened container 320C to internal routing logic 310.

Referring now to FIG. 5B, session router 303 may forward a new session request 528, corresponding to new session request 503, to container 320C.

Container 320C may process 530 new session request 528 and provide responsive data 533 to session router 303.

Session router 303 may process 535 responsive data 533. For example, security module 313 may compare new session request 503 and responsive data 533 to expected traffic patterns for container 320C. Session router 303 may then provide responsive data 538, corresponding to responsive data 533, to client device 203A.

During the processing 535 of responsive data 533, session router 303 may determine that a preemptive security precaution should be taken. For example, some characteristic about the exchange of new session request 503 and responsive data 533 may have been indicative of an attempt to initiate a stack overflow attack on a middle tier application running within container 323C. Session router 303 may therefore provide a reload application request 540 to container 323C. Container 323C may responsively discard some or all of its current instantiations of various middle tier applications and load 543 new, randomized copies of the same middle tier applications. Thus, legitimate communications between client device 203A and container 320C may proceed unimpeded, while any attack designed to exploit a stack overflow vulnerability that may have been detected in the previous versions of the middle tier applications may now be less effective, if not wholly ineffective, against the new, randomized versions of the middle tier applications.

Meanwhile, client device 203A may interact 545 with responsive data 538 and provide session router 303 with a data update request 548. Session router 303 may process data update request 548, for example by determining which container the data update request should be routed to and examining the data update request for security purposes.

Session router 303 may provide a data update request 553, corresponding to data update request 548, to container 323C. Container 323C may process 555 data update request 553 and provide responsive data 558 to session router 303. Session router 303 may process 560 responsive data 558. For example, security module 313 may compare data update request 548 and responsive data 558 to expected traffic patterns for container 320C. Session router 303 may then provide responsive data 563, corresponding to responsive data 558, to client device 203A.

Referring now to FIG. 5C, client device 323A may provide a quit session request 568 to session router 303. Session router 303 may process 570 quit session request 568, for example by determining which container the quit session request should be routed to and examining the quit session request for security purposes. Session router may then provide a quit session request 573, corresponding to quit session request 568, to container 323C. Container 323C may shut down 575 the current session and provide a session shut down confirmation 578 to session router 303. Session router 303 may then process 580 session shut down confirmation 578 and provide a session shut down confirmation 583, corresponding to session shut down confirmation 578, to client device 203A.

Container 323C may also provide a close container request 588 to container instance manager 305. Container instance manager 305 may then close 588 container 323C, for example by creating an encrypted copy of the container's last open state and then discarding the container's contents.

Container instance manager 305 may then provide the encrypted container 590 to encrypted datastore 308, which may store 593 encrypted container 590. Container instance manager may also provide a container closed notification 595 to session router 303, e.g. so that references to container 323C are removed from internal routing logic 310.

External Communications Monitoring Routine

Figure 6:
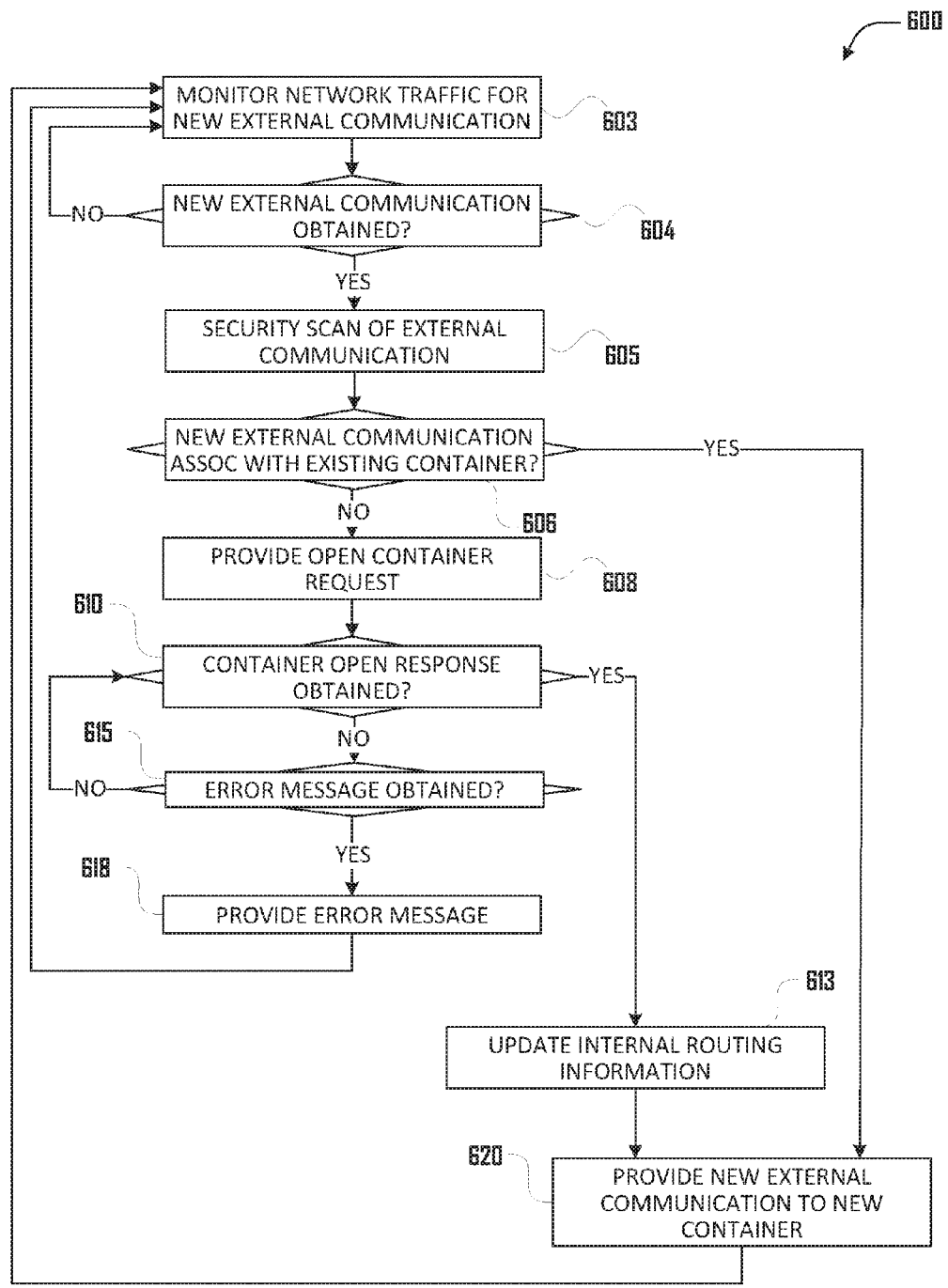
FIG. 6 illustrates a flow diagram of an exemplary external communications monitoring routine in accordance with aspects of at least one embodiment.

FIG. 6 illustrates a flow diagram of an exemplary external communications monitoring routine 600 such as may be implemented by various embodiments of session router 303 in accordance with the present methods and systems.

External communications monitoring routine 600 monitors external network traffic for new external communications addressed to components or containers of containerized data security system 300 at execution block 603.

At decision block 604, if a new external communication is obtained, external communications monitoring routine 600 may proceed to execution block 605; otherwise external communications monitoring routine 600 may loop back to execution block 603 to continue monitoring external network traffic for new external communications.

External communications monitoring routine 600 may conduct a security scan of the newly obtained external communication at execution block 605. The security scan may implement some or all of the features of security module 313 discussed above.

At decision block 606, if the newly obtained external communication is associated with an existing container, then external communications monitoring routine 600 may proceed to execution block 620; otherwise external communications monitoring routine 600 may proceed to execution block 608.

External communications monitoring routine 600 may provide an open container request, e.g. to container instantiation routine 800, discussed below with reference to FIG. 8, at execution block 608. The open container request may include identifying information from the newly obtained external communication.

At decision block 610, if a container open confirmation response is obtained responsive to the open container request provided above, then external communications monitoring routine 600 may proceed to execution block 613; otherwise external communications monitoring routine 600 may proceed to decision block 615.

External communications monitoring routine 600 may update internal routing information responsive to the container open confirmation response at execution block 613.

At decision block 615, if an error message is obtained response to the open container request provided above, then external communications monitoring routine 600 may proceed to execution block 618; otherwise external communications monitoring routine 600 may loop back to decision block 610.

External communications monitoring routine 600 may provide an error message responsive to the newly obtained external communication at execution block 618, and then loop back to execution block 603 to continue monitoring external network traffic for new external communications.

External communications monitoring routine 600 may provide the new external communication to the appropriate container, e.g. based on internal routing logic 310, at execution block 620. External communications monitoring routine 600 may then loop back to execution block 603 to continue monitoring external network traffic for new external communications.

Internal Communications Monitoring Routine

Figure 7:
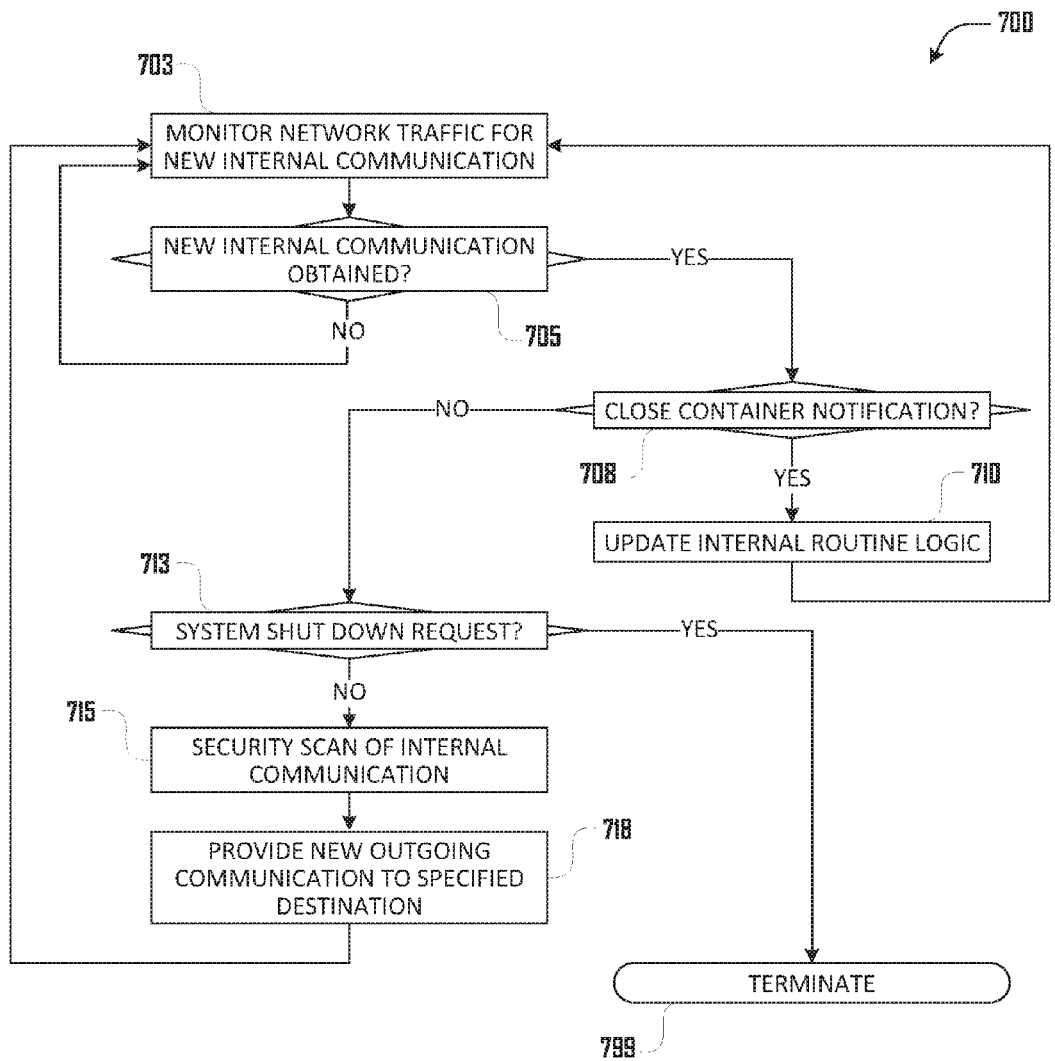
FIG. 7 illustrates a flow diagram of an exemplary internal communications monitoring routine in accordance with aspects of at least one embodiment.

FIG. 7 illustrates a flow diagram of an exemplary internal communications monitoring routine 700 such as may be implemented by various embodiments of session router 303 in accordance with the present methods and systems.

Internal communications monitoring routine 700 monitors internal network traffic within containerized data security system 300 for a new internal communication at execution block 703.

At decision block 705, if no new internal communication is obtained, internal communications monitoring routine 700 may loop back to execution block 703 to continue monitoring internal network traffic for new internal communications; otherwise internal communications monitoring routine 700 may proceed to execution block 708.

At decision block 708, if the new internal communication is a close container notification, e.g. obtained from container instance manager 305, internal communications monitoring routine 700 may proceed to execution block 710; otherwise internal communications monitoring routine 700 may proceed to decision block 713.

Internal communications monitoring routine 700 updates internal routing logic 310 responsive to the close container notification at execution block 710. Internal communications monitoring routine 700 may then loop back execution block 703 to continue monitoring internal network traffic for new internal communications.

At decision block 713, if the new internal communication is a system shutdown request, internal communications monitoring routine 700 may proceed to termination block 799 (termination block 799 may also terminate external communications monitoring routine 600); otherwise, for purposes of this example, it is assumed the newly obtained internal communication is an outgoing communication specifying an intended destination, such as client device 203A, and internal communications monitoring routine 700 may proceed to execution block 715.

Internal communications monitoring routine 700 may conduct a security scan of the newly obtained external communication at execution block 715. The security scan may implement some or all of the features of security module 313 discussed above.

Internal communications monitoring routine 700 may provide a new outgoing communication corresponding to the newly obtained internal communication directed to the intended destination at execution block 718. Internal communications monitoring routine 700 may then loop to execution block 703 to continue monitoring internal network traffic for new internal communications.

Container Instantiation Routine

Figure 8:
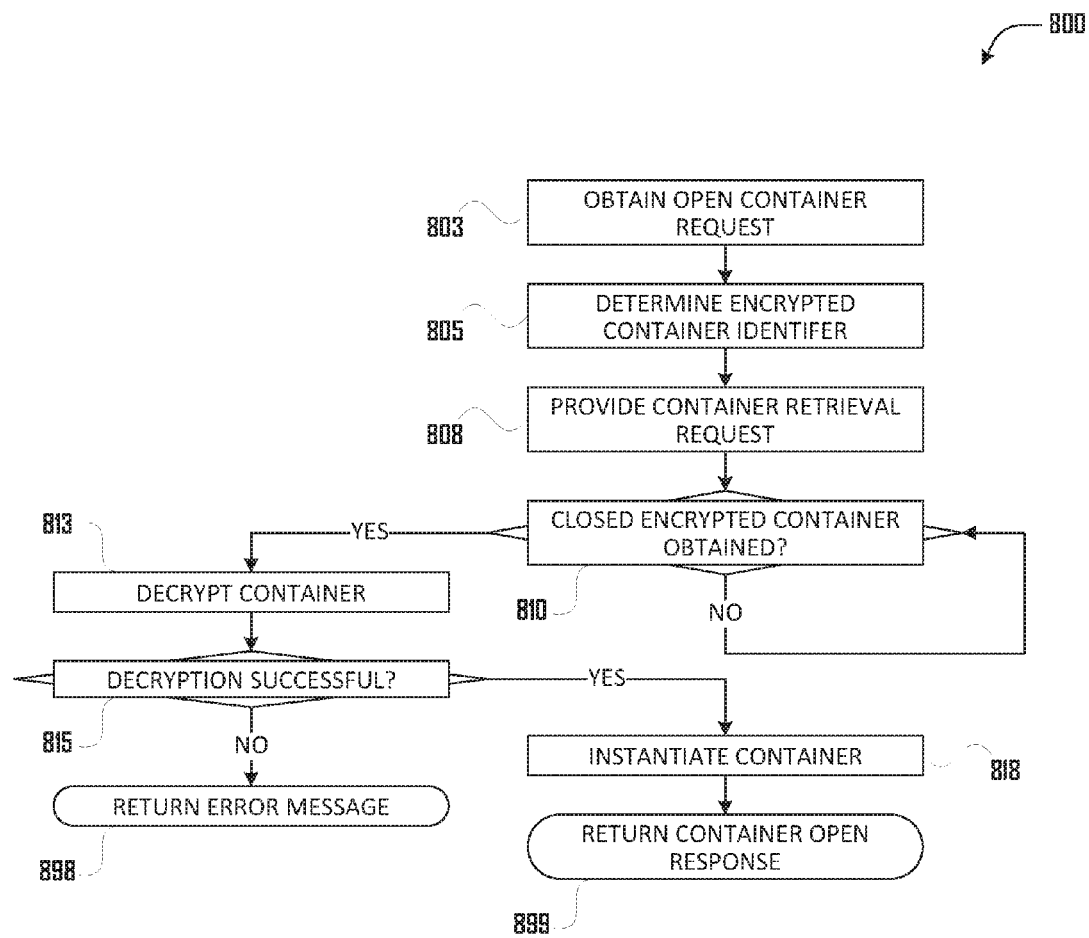
FIG. 8 illustrates a flow diagram of an exemplary container instantiation routine in accordance with aspects of at least one embodiment.

FIG. 8 illustrates a container instantiation routine 800 such as may be implemented by various embodiments of container instance manager 305 in accordance with the present methods and systems.

Container instantiation routine 800 may obtain an open container request, e.g. from external communication monitoring routine 600, described above, at execution block 803.

Container instantiation routine 800 may determine an encrypted container identifier associated with the open container request at execution block 805. For example, the open container request may include an identifier associated with a specific unit of interest and container instantiation routine 800 may search for a corresponding encrypted container identifier in a look up table.

Container instantiation routine 800 may provide a container retrieval request, e.g. to encrypted data store 308, including the encrypted container identifier at execution block 808.

At decision block 810, if a closed encrypted container is obtained responsive to the container retrieval request, then container instantiation routine 800 may proceed to execution block 813.

Container instantiation routine 800 may decrypt the encrypted container at execution block 813. For example, the open container request may include a key identifier associated with a specific unit of interest and container instantiation routine 800 may search for a corresponding decryption key in a look up table.

At decision block 815, if the decryption is successful, container instantiation routine 800 may proceed to execution block 818; otherwise container instantiation routine 800 may proceed to return block 898 and return an error message, e.g. indicating the desired container could not be opened using the provided key identifier.

Container instantiation routine 800 may instantiate the decrypted container at execution block 818 and then return a container open response to the open container request at return block 899.

Container Closing Routine

FIG. 9 illustrates an exemplary container closing routine 900, such as may be implemented by various embodiments of container instance manager 305 in accordance with the present methods and systems.

Routine 900 may obtain a close container request at execution block 903. For example, the close container request may be obtained from a container, such as container 320D, that has determined it is no longer in use or from session routine 303.

Routine 900 may encrypt the container in its current state at execution block 905.

Routine 900 may provide the encrypted container to encrypted data store at execution block 908.

Routine 900 may terminate at termination block 999.

A Simplified Implementation of the Present Methods and Systems

By way of example, the present methods and systems may be applied to implement an exemplary containerized healthcare records data security system providing the same external functionality as the simplified healthcare records system discussed above with reference to FIG. 1.

As discussed above, this system may store the medical records for eighty million individuals, along with personal information such as addresses, Social Security numbers, and credit card numbers. Three middle tier applications which access this data are considered: (1) a web portal accessible by doctors and their patients; (2) a monthly patient report generator; and (3) an executive dashboard for the insurance company showing various statistics on their customer base.

In accordance with the present methods and systems, customers are the relevant unit of interest and a customer identification number therefore may be a useful sharding dimension. An individual customer A would need access to all of his or her data along with the middle tier functionality needed to manipulate it. However, it is very unlikely that customer A would have a legitimate reason to access data associated with customer B. (Zip code or other data about a customer could also be used for the sharding algorithm, depending on the implementation.)

Accordingly, eighty million individual customer record containers may be created, encrypted, and stored in an encrypted data store (not shown). Each of the eighty million customer record containers may be private and may contain the associated customer's personal information, medical records, and a copy of a web site application and report generating application. Each customer container may be individually encrypted, for example with keys only being provided to the individual customer, or to the individual customer and the customer's primary care physician. The patient needs access to everything. Similarly, the patient's doctors would also need access to the data, but possibly not everything. For example, the optometrist checking the patient's vision and prescribing contacts would not need to know the patient's HIV status. Therefore, a layered key approach, discussed above, may be appropriate. For example, an 'instance master' key may be shared amongst all of the patient's doctors, enabling them to run the patient instance and access the middleware applications for managing and updating medical records. However, individual specific records (like HIV status) can be further protected with additional encryption and access controls.

The executive dashboard functionality may by implemented by a shared container containing a data aggregation application and a data set application aggregating data fed to it from a cross-container aggregation service. The health insurance company's public facing website may be implemented in a public container containing a website application and data corresponding to the pages of the website.

In certain embodiments, an authenticated login may provide the decryption key for an individual container. For example, "portal.insurance.com/contact" may route to the public container for the contact information page, whereas "portal.insurance.com/dashboard/johnsmith" may route to a private container for the customer named John Smith, and include the customer's individual web application instance. Thus, an incoming request related to the public facing website may be routed to public instance container that includes only the middle tier applications and data necessary to supply the requesting client device with the data required to render the website while an incoming request related to accessing a user's personal account information may be routed to a private container that includes only the middle tier applications and data necessary to authenticate the request and provide the requesting client device with data relating to the requested personal account information.

In either situation, given a legitimate request, the presence of the containerized data security system should be transparent to the requesting client device, as all the applications and data needed for legitimate uses are present in the container; given a request with an illegitimate purpose, e.g. related to an actor attempting to gain unauthorized access to users' personal account information, in the case of the public container, there is no private user data to obtain and in the case of the private container, only the data related to the requested user account is present and in order to gain access to additional user account data, the security and authentication features of corresponding additional containers will have to be independently defeated.

In the case of particularly sensitive data, such as a customer's HIV status for example, although that data should be fully contained within the container itself, it is also reasonable that the executive dashboard middle tier application should have access to certain types of aggregate information, such the percentage of customers that have a positive HIV status. To implement this functionality in this example, upon first instantiation or upon a change to the HIV status record from within the container, each private individual container may an anonymous and secure call to an aggregation service that tracks various aggregate statistics for use by the executive dashboard application. The call could simply contain the information "yes" or "no" with no other identifying information. Aggregation service may then update an aggregate positive HIV status data record in an aggregate record data store. This is sufficient to permit the executive compute the percentage of customers that have HIV Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein.

What is claimed is:

1. A system useful in facilitating containerized data security, the system comprising:
   a data store containing at least a plurality of N encrypted containers each having a respective virtual middle-tier server and virtual data store, including a first virtual middle-tier server and a first virtual data store in a first container of said N encrypted containers, said first container including data associated with a unit of interest to the system and encrypted instructions corresponding to at least one application hosted by said first virtual middle-tier server;
   a computer processing unit;
   a network interface in data communication with said computer processing unit and said data store; and
   memory in data communication with said computer processing unit and containing executable instructions for causing said computer processing unit to perform a containerized data security method including:
   (a) obtaining a first external communication from a source external to the system;
   (b) associating said first external communication with said first container;
   (c) authenticating a login attempt via said first external communication with respect to said first container and obtaining a decryption key from said source external to the system;
   (d) after creating an unencrypted instance of said first container using said decryption key from said source external to the system and after establishing an encrypted communication channel between said unencrypted instance of said first container and said source external to the system, providing said first external communication to said unencrypted instance of said first container in said memory;

(e) obtaining a first responsive communication from said unencrypted instance of said first container;

(f) providing said first responsive communication to said source external to the system via said encrypted communication channel between said unencrypted instance of said first container and said source external to the system; and (g) according to a traffic monitoring protocol, discarding some or all middle-tier applications each having a respective version instantiated in said unencrypted instance of said first container and replacing said discarded applications with new randomized instantiations of the same applications each having a version that is different from its respective version, causing a failure of attacks that may have succeeded in compromising code inside said unencrypted instance of said first container as a conditional response to determining that tracked traffic to or from said unencrypted instance of said first container has diverged from legitimate traffic patterns.

2. The system of claim 1, wherein step (b) of said containerized data security method includes:
obtaining an encrypted version of said first container from said data store;
decrypting encrypted version of said first container; and
instantiating said unencrypted instance of said first container in said memory.

3. The system of claim 2, wherein said containerized data security method further includes using information contained in said first external communication to identify a decryption key associated with said first container.

4. The system of claim 1, wherein said first container includes only data associated with a first unit of interest to the system and said containerized data security method further includes:
(a) obtaining a second external communication from said source external to the system;
(b) associating said second external communication with said first container;
(c) determining said second external communication is associated with a second unit of interest to the system; and
(d) flagging said source external to the system as a security risk.

5. The system of claim 1, wherein said containerized data security method further includes, subsequent to step (e):
encrypting said unencrypted instance of said first container, thereby creating a new encrypted version of said first container; and
providing said new encrypted version of said first container to said data store.

6. The system of claim 1, wherein said first container includes a virtual middle tier server and a virtual data center.

7. The system of claim 1, wherein said first container is a private container.

8. The system of claim 1, wherein said first container is a shared container.

9. The system of claim 1, wherein said first container is a public container.

* * * * *